May 2, 1944.　　　　J. F. PARKER　　　　2,347,841

SEAPLANE

Filed May 14, 1941　　　　7 Sheets-Sheet 1

Inventor

James F. Parker

By Clarence A. O'Brien

Attorney

May 2, 1944.  J. F. PARKER  2,347,841

SEAPLANE

Filed May 14, 1941  7 Sheets-Sheet 2

Inventor
James F. Parker

By Clarence A. O'Brien

Attorney

May 2, 1944. J. F. PARKER 2,347,841
SEAPLANE
Filed May 14, 1941 7 Sheets-Sheet 3
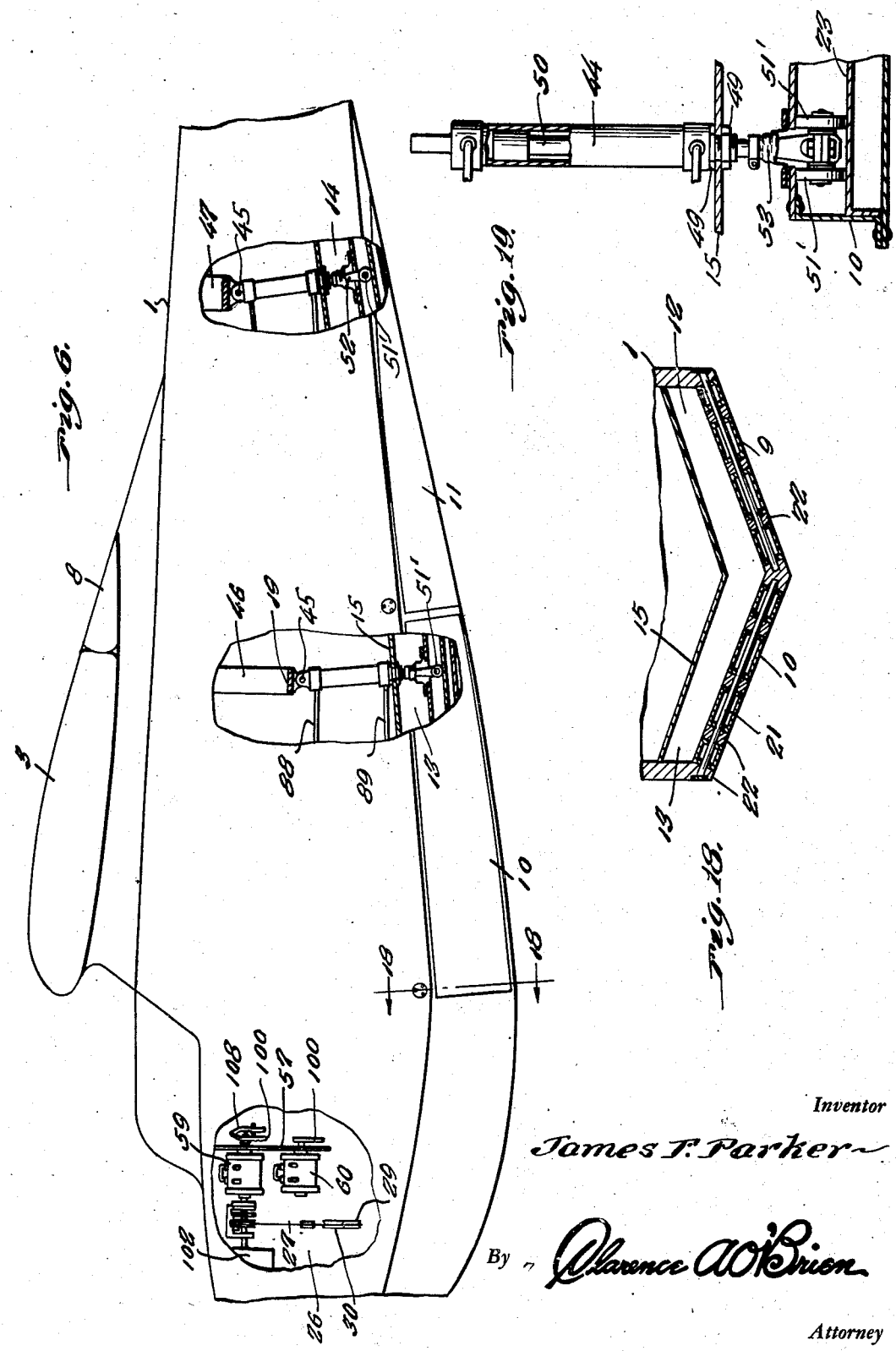
Inventor
James F. Parker
By Clarence A. O'Brien
Attorney May 2, 1944.　　　J. F. PARKER　　　2,347,841
SEAPLANE
Filed May 14, 1941　　　7 Sheets-Sheet 4
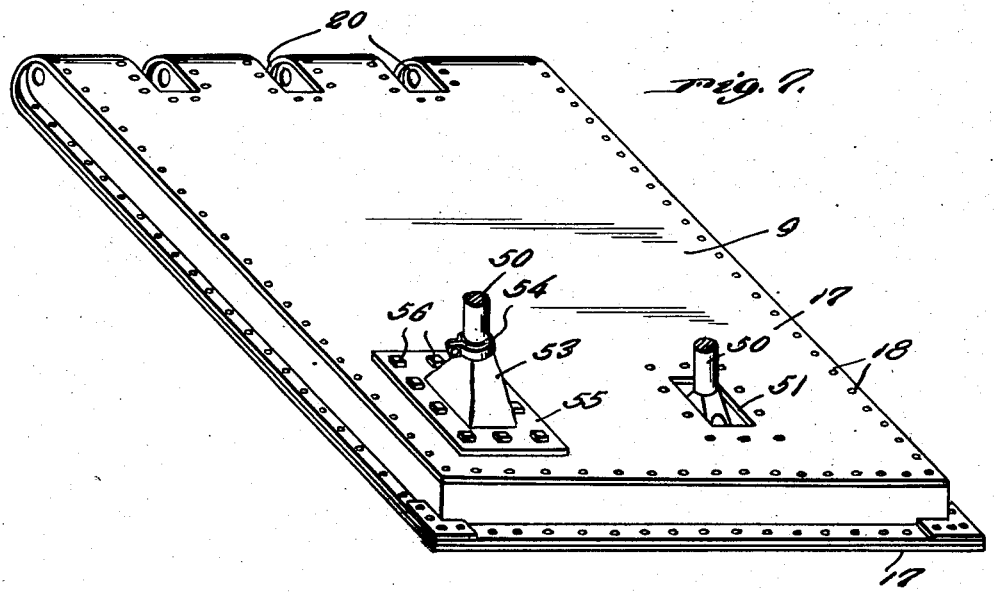
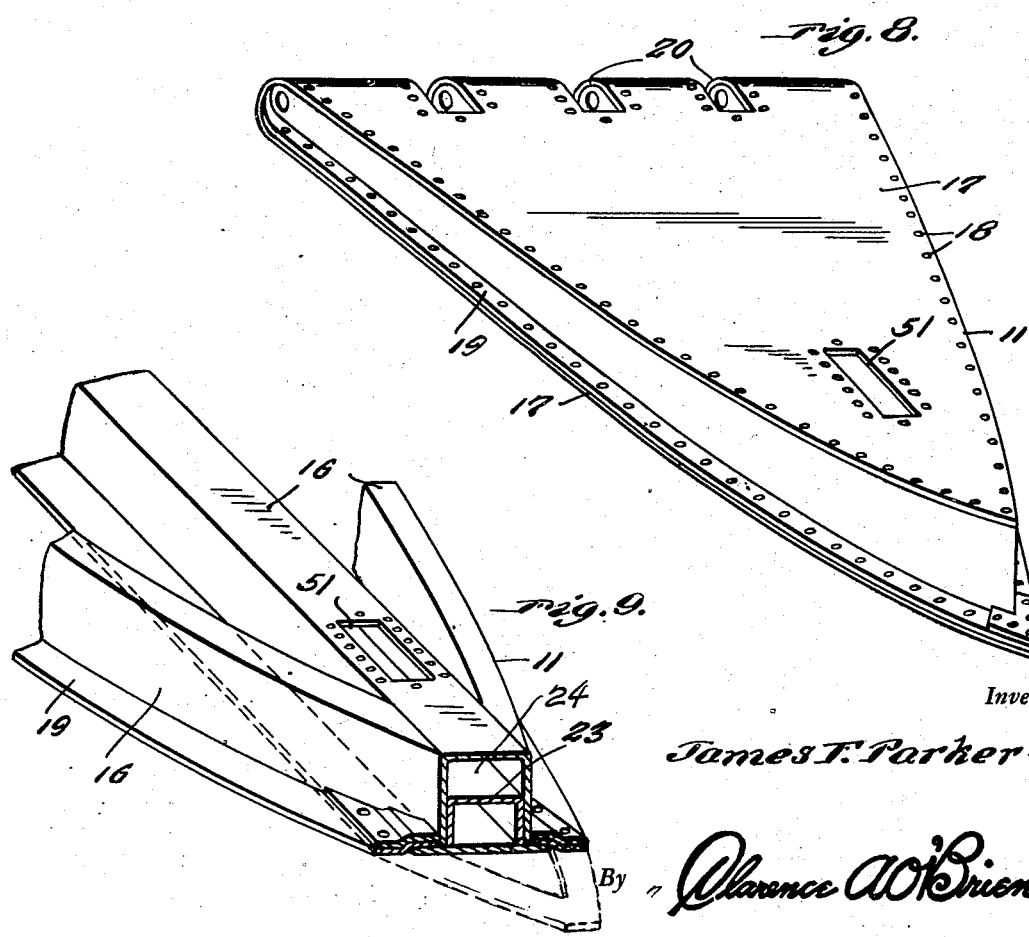
Inventor
James F. Parker
By Clarence A. O'Brien
Attorney

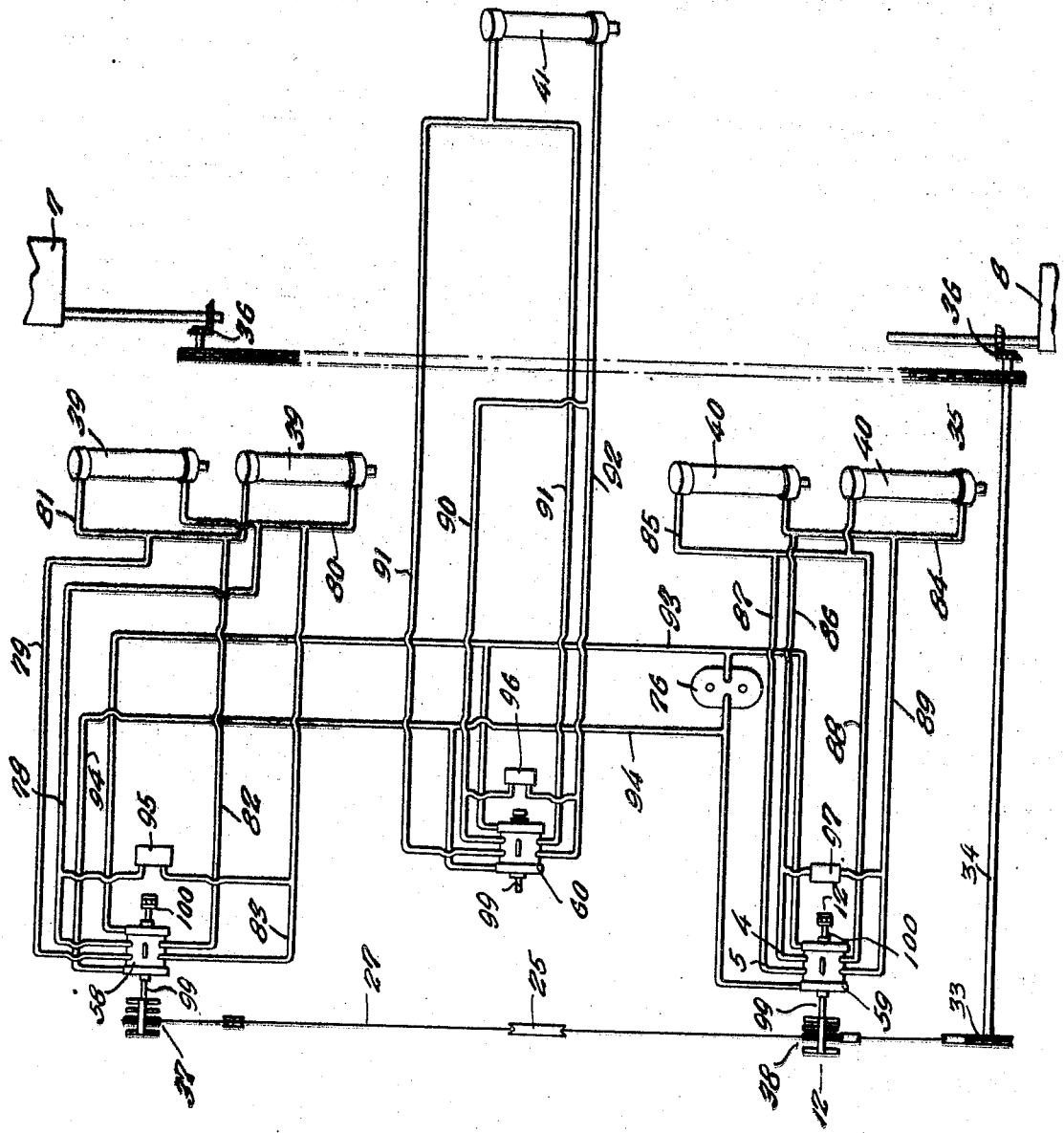

May 2, 1944. J. F. PARKER 2,347,841
SEAPLANE
Filed May 14, 1941 7 Sheets-Sheet 6

Inventor
James F. Parker
By Clarence A. O'Brien
Attorney

May 2, 1944. J. F. PARKER 2,347,841
SEAPLANE
Filed May 14, 1941 7 Sheets-Sheet 7
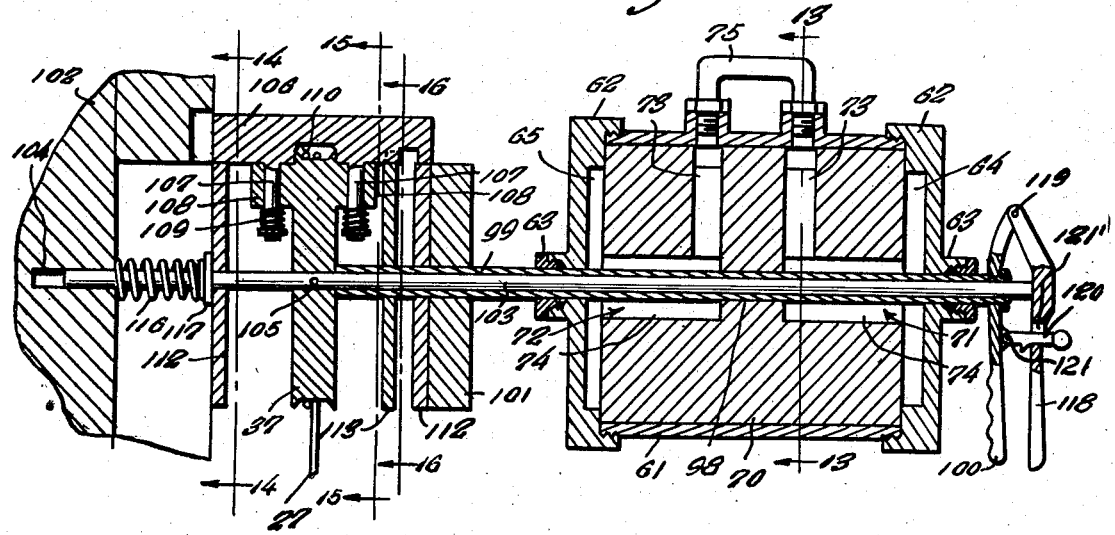
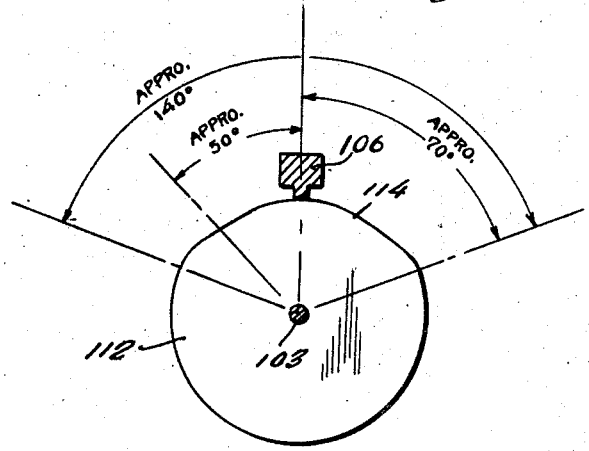
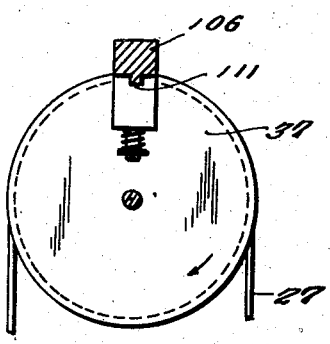
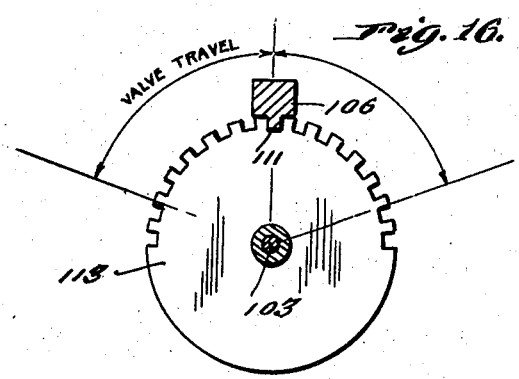
Inventor
James F. Parker
By Clarence A. O'Brien
Attorney Patented May 2, 1944

2,347,841

UNITED STATES PATENT OFFICE 2,347,841

SEAPLANE

James F. Parker, Guantanamo Bay, Cuba

Application May 14, 1941, Serial No. 393,436

5 Claims. (Cl. 244—106)

My invention relates to improvements in seaplanes of the type embodying hull sections, commonly and hereinafter termed steps, and which are adjustable to control the performance of the plane on water.

Among the important objects of my invention are to provide an improved construction and arrangement of such steps on the hull, together with improved means for adjusting the same either under manual control, or automatically, as an incident to aileron control to effect hydrodynamic reactions on the plane augmenting the aerodynamic reactions effected by the ailerons and other flight controls, all so as to accomplish improved takeoff performance from the water, turning, and trimming the plane on the water, and reducing when in the air parasite drag caused by the irregular shape of the usual seaplane hull and other well known factors.

Other and subordinate objects are also comprehended by my invention, all of which, together with the precise nature of my improvement, will be readily understood when the succeeding description and claims are read with reference to the drawings accompanying and forming part of this specification.

In said drawings:

Figure 6 is a fragmentary view in side elevation of the hull of the seaplane broken away to illustrate the relation of parts therein.

Figure 7 is a view in perspective of one of the pair of forward steps.

Figure 8 is a similar view of the rear step.

Figure 9 is another similar view of the frame of the rear step drawn to an enlarged scale and partly shown in section.

Figure 10 is a schematic view of the hydraulic operating mechanism for the steps, also showing the aileron control.

Figure 11 is a similar view of one of the control valves of said mechanism, together with one of the hydraulic jacks controlled thereby, and the fluid pump.

Figure 12 is a view in longitudinal section taken on the line 12—12 of Figure 10 and drawn to an enlarged scale.

Figure 14 is a view in transverse section taken on the line 14—14 of Figure 12.

Figure 15 is a similar view taken on the line 15—15 of Figure 12.

Figure 16 is a similar view taken on the line 16—16 of Figure 12.

Figure 17 is a view in perspective of one of the clutch bars.

Figure 18 is a detail view in transverse section of the hull body taken on the line 18—18 of Figure 6, and Figure 19 is a similar view taken on line 19—19 of Figure 6.

Figure 1:
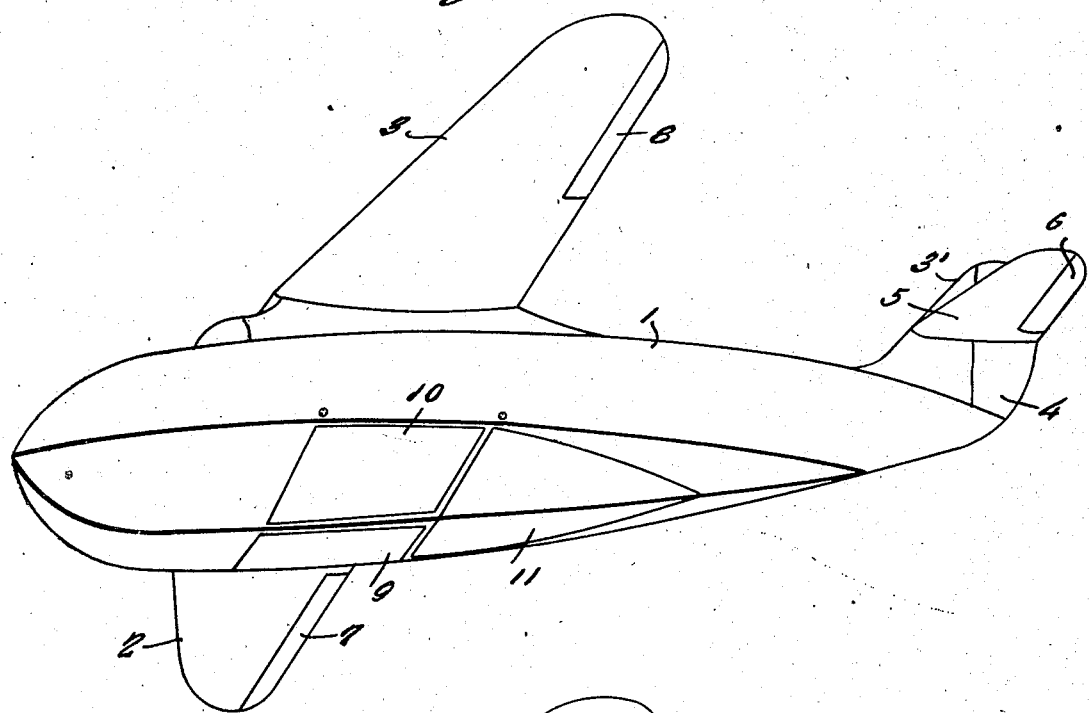
Figure 1 is an inverted perspective view of a seaplane equipped with my improved steps retracted to complete the streamline contour of the hull.
Figure 2:
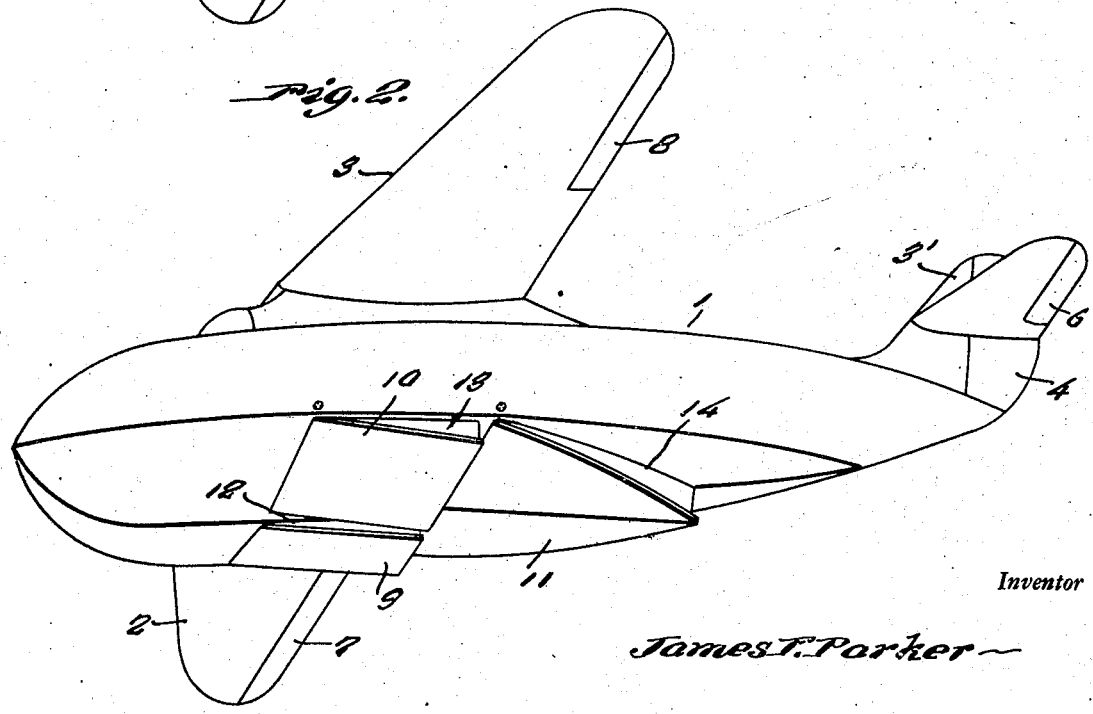
Figure 2 is a similar view with the steps partially lowered.
Figure 3:
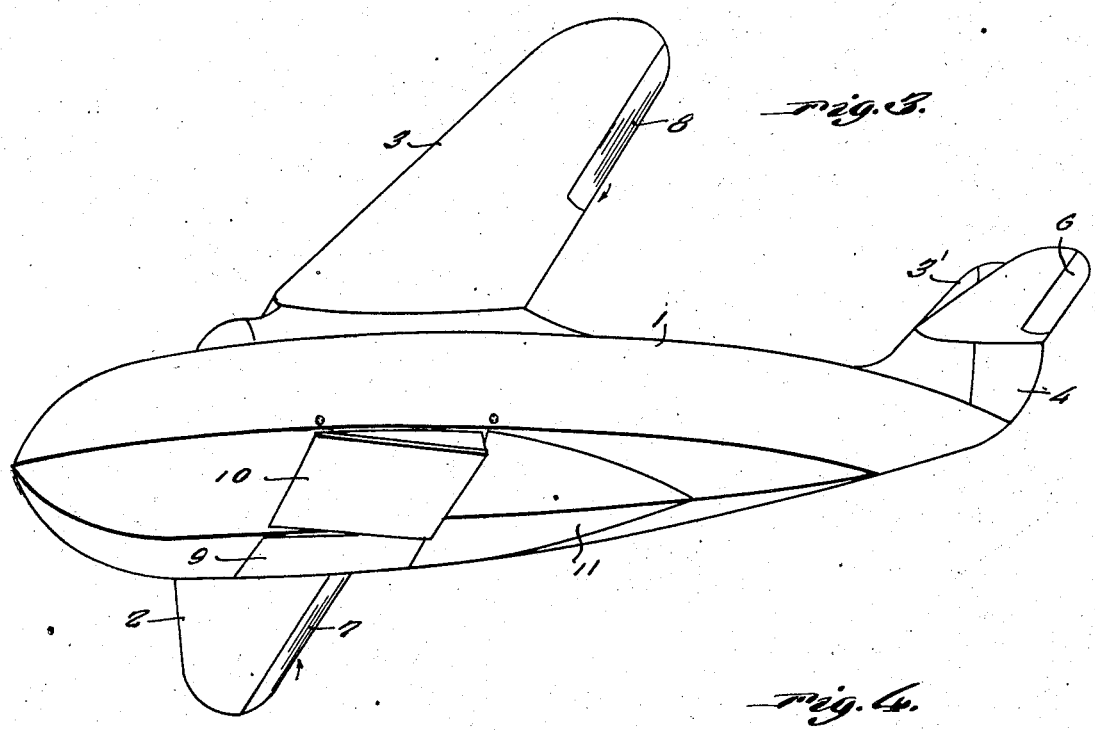
Figure 3 is another similar view with the port step partially lowered.
Figure 4:
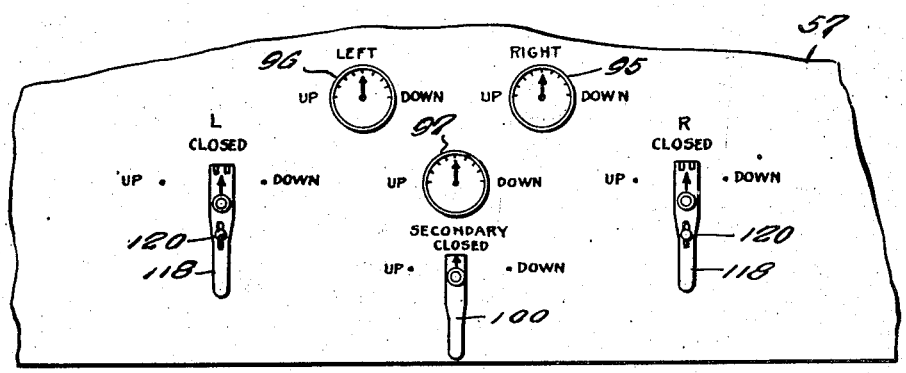
Figure 4 is a fragmentary view in front elevation of the instrument and control panel.

Referring to the drawings by numerals, my invention has been illustrated therein as embodied in a seaplane conventionally illustrated as sufficient for the present purposes, 1 designating the usual hull, with the exceptions presently noted, 2, the wings, 3', the fin, 4 the rudder, 5 one of the stabilizers, 6 one of the elevators, and 7 and 8 are starboard and port ailerons, respectively. Other parts, not essential to an understanding of the invention have been eliminated for the sake of clearness of illustration.

According to my invention, a pair of forward, starboard and port, primary, steps 9, 10 are provided on the bottom of the hull 1, side by side, directly beneath the wings 2, 3, and upon opposite sides of the keel of the hull, respectively, and immediately in the rear of said pair, a rear, secondary step 11 centered in the keel line of the hull. The steps 9, 10 are generally rectangular and of like size and their front edges are aligned transversely of the hull 1.

The rear step 11 is substantially triangular with its front end substantially corresponding in width to the distance between the outer sides of the steps 9, 10 and its apex trailing. A pair of starboard and port wells 12 and 13 of suitable form and construction are provided in the hull 1 in which the steps 9, 10 are designed to fit flush with the outer surface of the hull. A similar well 14 is provided for the rear step 11 in which said step also fits flush. As best shown in Figures 6 and 19, the wells 12, 13, 14 are preferably formed below a false bottom 15 in the hull.

The steps 9, 10, 11 comprise suitably arranged frame bars, as at 16, in Figure 9, of Duralumin, or stainless steel, covered with a top and bottom "skin" of Duralumin sheets 17 riveted in place, as at 18, on the frame, the construction and arrangement being such that said steps embody a base lateral flange 19 for seating against the outer side of the hull 1 to form a seal around the wells 12, 13, 14, and hinge barrels 20 along the front ends thereof for receiving pivot rods, as at 21, suitably extended through bearings 22 formed at the front edges of said wells, as best shown in Figure 18, so that the steps 9, 10, and 11 are vertically swingable from closed positions flush with the hull 1, downwardly into different rearwardly and downwardly inclined positions. Each step 9, 10, 11 is provided with an intermediate horizontal partition plate, as shown for instance at 23, in Figure 9, forming with the frame structure a chamber in the upper part of the step and designated 24.

Figure 5:
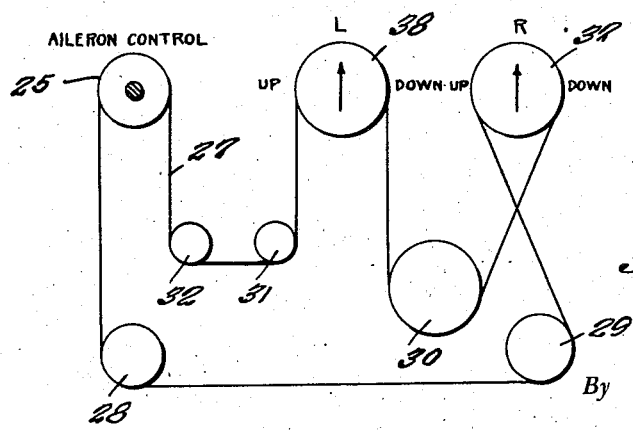
Figure 5 is a diagrammatic view of the aileron control.

The aileron control, Figures 5 and 10 comprises the usual control wheel 25 in the cockpit 26 and cable 27 operated thereby over pulleys 28, 29, 30, 31, 32 and operatively connected, as by pulley 33 together with the shaft 34, sprocket and chain drive 35, and gearing 36 to the ailerons so that by rotation of the control wheel 25 in opposite directions the ailerons 7, 8 are operated in the usual manner in opposite directions relatively. The aileron control embodies therein a pair of starboard and port valve operating pulleys 37, 38 in the cockpit 26 operative through the medium of the cable 27 in relatively opposite directions as an incident to operation of the control wheel 25 in either direction and which form a part of hydraulic step operating mechanism to be described.

The hydraulic step operating mechanism preferably comprises the following:

For elevating and lowering the steps 9, 10, 11 hydraulic jacks are provided there being a pair 39 for the starboard step 9, a pair 40 for the port step 10, and a single one 41 for the rear step 11.

The jacks 39, 40, 41 are of the usual double acting piston type including a cylinder 44. The cylinders 44 of the pairs of jacks 39, 40 are bolted, as at 45, at upper ends thereof in the hull 1 to suitable supports 46 with the jacks of each pair spaced side by side over the rear ends of the steps 9, 10, and the cylinder 44 of the rear step jack 41 is similarly mounted on a support over the rear end of the rear step 11. The lower ends of the cylinders 44 are reduced and extended through the false bottom 15 of the hull 1 with packing glands 49 turned thereon upon opposite sides of said floor to form a watertight seal, said cylinders as will be understood, extending into the wells 12, 13, 14 of the related steps 9, 10, 11. The piston rod 50 of each pair of jacks 39, 40 extend through a pair of longitudinally extending slots 51 provided in the top of the appropriate step 9, 10, as the case may be, and into the chamber 24 of the step, said rods being equipped within the chamber 24 with a pair of laterally spaced rollers 51' fitting between the top of the step and the partition 23 thereof with a slight clearance and so as to roll forwardly and rearwardly of the step to compensate for the arcuate movement of the latter on its pivot. The piston rod 50 of the rear step jack 41 is operatively connected to the rear step 11 in the same manner as described with reference to the other piston rods 50. A boot 53 of flexible waterproof material is secured to each piston rod 50, 52 above the step by a suitable clamp, as at 54, and to the top of the step as by a clamping plate 55 bolted to the top, as at 56. The boots 53, as will be celar, form watertight seals between the piston rods 50, 52 and the steps 9, 10, 11.

In front of the instrument panel 57 of the seaplane is a pair of starboard and port side control valves 58, 59 for the pairs of jacks 39, 40, respectively, of the starboard and port steps 9, 10, and a control valve 60 for the jack 41 of the rear step 11. Each valve 58, 59, 60 is a counterpart of the other, therefore a description of one will suffice for all.

Figure 13:
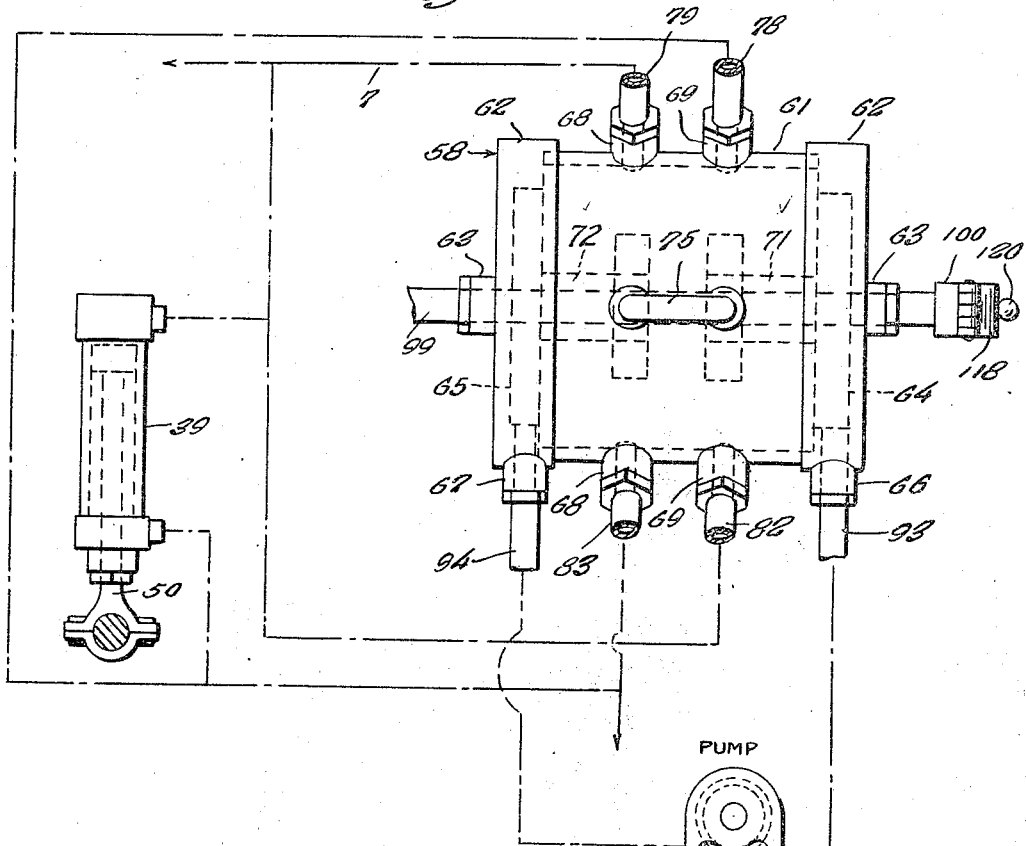
Figure 13 is a view in transverse section taken on the line 13—13 of Figure 12.
Figure 13A:
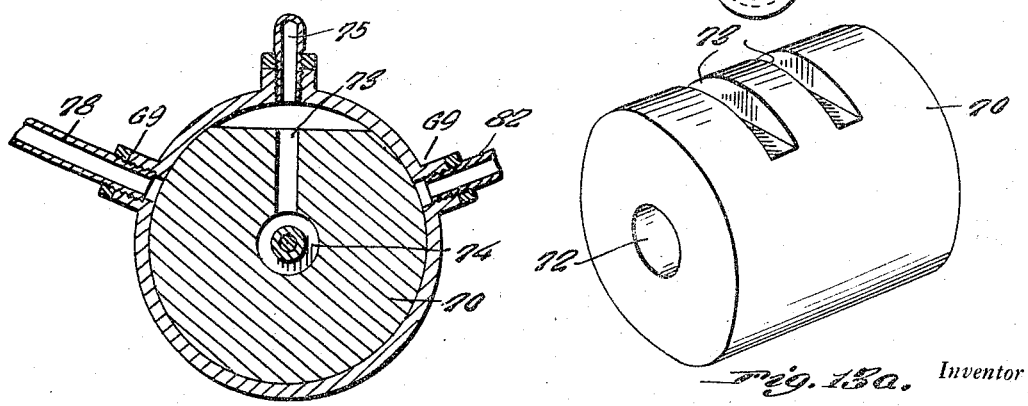
Figure 13a is a view in perspective of one of the control valve cores.

Each valve 58, 59, 60, as the case may be, comprises a suitable fixed cylindrical casing 61 (Figures 12, 13) arranged endwise to the instrument panel 57 and having end caps 62 provided with axial stuffing boxes 63 and internally chambered to provide, in conjunction with a valve core presently described, a pair of inlet and discharge chambers 64, 65 in the casing at opposite ends thereof, respectively, from which a pair of inlet and discharge nipples 66, 67 extend, respectively. Upon each side of the casing 61 is a pair of inlet and outlet nipples 68, 69, respectively, arranged in each pair in laterally spaced relation upon opposite sides of the transverse center of the casing 61, the pairs being arranged approximately in 140° angular relation above the horizontal center of the casing. A cylindrical valve core 70 is rotatably fitted in the casing 61 between the caps 62. The valve core 70 is provided upon opposite sides of its transverse center with a pair of intake and discharge ports 71, 72 each comprising a radial T-shaped branch 73 and a right angled branch 74 extending axially of the core. The intake port 71 is designed, under rotation in opposite directions of the core 70 to establish communication between inlet nipples 69, respectively, and the inlet chamber 64 (see Figures 11, 12), whereas, the discharge port 72 is designed to similarly establish communication between the outlet chamber 65 and the outlet nipples 69. On top of the valve casing 61 is a bypass 75 for establishing communication between the branches 73 of the intake and discharge ports 71, 72 by way of the branches 73 of the latter and when the core 70 is in a normal position presently described.

The described valves 58, 59, 60 are designed to control the flow of fluid under pressure from a continuously operating pump 76 mounted in the hull 1 in any suitable manner, and the described jacks 39, 40, 41 and said valves are interposed in a hydraulic circuit system as follows, attention being directed particularly to Figure 10.

The outlet and inlet valve nipples 69, 68 on one side of the valve casing 61 of control valve 58 for the starboard step 9 are connected by a pair of pressure and return lines 78, 79 to a pair of lower and upper manifolds 80, 81, respectively, the former manifold connecting the lower ends and the latter the upper ends of the cylinders 44 of the pair of jacks 39 for the starboard step 9. The outlet and inlet nipples 69, 68 on the other side of said casing 61 are connected by pressure and return lines 82, 83 to the manifolds 81, 80, respectively.

The valve 59 for the port step 10 is connected to the cylinders 44 of the port step jacks 40 in the same manner as described with reference to the valve 59, by a pair of lower and upper manifolds 84, 85 between the jack cylinders, a pair of pressure and return lines 86, 87 between one side of the valve and the manifolds, respectively, and another pair of pressure and return lines 88, 89 between the other side of said valve and said manifolds.

The valve 60 is connected to the jack 41 for the rear step in substantially the same manner as described with reference to the valves 58, 59, by pressure and return lines 90, 91 leading from one side of the valve 60 to the bottom and top, respectively, of the cylinder 44 of said jack, and a pair of pressure and return lines 91, 92 leading to the top and bottom of said cylinder, respectively.

A fluid pressure supply line 93 extends from the output side of the pump 76 to the inlet nipples 66 of the valve casings 61, and a fluid pressure return line 94 extends from the discharge nipples 67 of said casings 61 to the intake side of said pump.

Indicators 95, 96, 97 of any suitable character are mounted on the instrument panel 57 for indicating operations of the starboard, port, and rear steps 9, 10, 11, said indicators being interposed in the pressure and return lines in any suitable manner for operation in synchronism with the steps.

Coming now to the valve operating means, each valve 58, 59, 60 has extending axially therethrough, see Figure 12, by way of the stuffing boxes 63 and a central counterbore 98 in each core 70, a hollow core operating shaft 99 to which said core is fixed, the shaft having a rear end extending through and journaled in the instrument panel 57 with an operating lever 100 fixed thereon crosswise thereof in the rear of said panel. The front end of the hollow shaft 99 extends forwardly through a bearing plate 101 in the hull 1 in which plate said shaft is suitably mounted for rotation and against endwise movement.

As will be obvious, the described hollow shafts 99, operating levers 100 and the shaft mountings provide for manual operation of the core 70 of the valves 58, 59, 60, selectively.

In the case of the valves 58, 59 for the starboard steps 9, and the port step 10, means are provided for operating the hollow shafts 99 in conjunction with the ailerons 7, 8 and through operation of the previously described aileron control. This means comprises a clutch for each valve 58, 59 interposed between the plate 101 and the front structure 102 of the cockpit 26.

Each clutch comprises a clutch control shaft 103 extending through the hollow shaft 99 of the valve and endwise slidable and rotatable in shaft 99, said shaft 103 having its front end similarly mounted in the structure 102, as at 104. The beforementioned starboard and port valve operating pulleys 37, 38 are fixed on the shafts 103 of the valves 58, 59, each by a pin 105, as shown for instance in Figure 12. Surmounting each pulley 37, 38 is a transversely extending clutch bar 106 mounted on the pulley for radial movement upwardly and downwardly by means of a pair of guide pins 107 slidable in a pair of lateral ears 108 extending from opposite sides of the pulley, respectively. Suitable springs 109 on the pins 107 tension the clutch bar against upward movement and retain the same seated on said ears. A notch 110 in the clutch bar 106 accommodates the cable 27. A longitudinal, tooth-forming, rib 111 on the bottom of the clutch bar rests at its ends on a pair of stationary cams 112 arranged upon opposite sides of the pulley 37, 38, respectively. The rib 111 normally meshes with a gear 113 fast on the hollow shaft 99. The cams 112 are arranged with low top portions, as at 114, such that if the pulley 37, 38 is rocked in either direction from a normal position through approximately 70° of movement, the clutch bar 106 through the gear 112 and hollow shaft 99 will correspondingly rock the valve core 70 from normal position, at which point the cams 112 will elevate the clutch bar 106 to disengage the rib 111 from the gear 113. The purpose of said disengagement is to disable the aileron control as regards operation of the valves 58, 59 in the limits of operation of said valves so as to permit continued operation of the aileron control, this being necessary because the ailerons are swingable through a greater arc of movement than is essential to operation of the valves 58, 59 from normal position into the limits of movement in either direction.

By sliding the clutch control rod 103 forwardly, the pulleys 37, 38 thereon and the clutch bars 106 may be moved forwardly relative to the gears 113 to disengage the ribs 111 from the gears and register a notch 115 in the bars with said gears so that the clutch is disengaged from the core operating shafts 99 and said shafts 99 are free for manual operation by the operating levers 100 to operate the cores 70. A spring 116 interposed on the clutch shaft 103 between the structure 102 and a collar 117 on said shaft tensions the clutch shaft 103 against operation to disengage the clutch. A clutch shaft operating lever 118 is pivoted at one end, as at 119, on one end of the lever 110 to bear against the rear end of the clutch shaft 103, the arrangement being such that by grasping the levers 100, 118 and pressing the same together the lever 118 may be forced against the clutch shaft 103 to force the same forwardly into clutch disengaging position. A gravity catch 120 is pivoted, as at 121, on the lever 100 to extend through a slot 121' in the lever 118 and interlock with the lever 118 when the latter is operated to move the clutch control shaft 103 into clutch disengaging position, so that the levers 100, 118 are then locked together and the clutch locked disengaged, and the valve core 70 may then be manually operated by the lever 100.

As will be understood, the valve 60 controlling the rear step 11 is operated manually, solely, through the lever 100 and is in no way affected by the aileron control.

Referring now to the operation, normally when flying, the steps 9, 10, 11 are retracted into the wells 12, 13, 14 flush with the hull 1. The valve cores of valves 58, 59, 60 are turned to normal position in which the T branches 73 of the intake and discharge ports 71, 72 are in an intermediate position in registration with opposite ends of the bypasses 75. The hydraulic pressure is flowing from the output side of the pump 76 through each of the valves by way of inlet nipples 66, inlet chambers 64, intake ports 71, bypasses 75, and discharge ports 72. The pistons 50, 52 of the jacks 39, 40, and 41 are in this position of the steps 9, 10, 11 at the tops of the cylinders 44.

When on the water, the steps 9, 10, 11 may be lowered to any desired angle as follows:

By manipulation of the valve operating levers 100, the valve cores 70 are rotated in the proper direction to register the T branches 73 with the pair of inlet and outlet nipples 68, 69 registering, in the case of the valve 58, with the pressure and return lines 78, 79, in the case of the valve 59 with the pressure and return lines 86, 87, and in the case of the valve 60 with the pressure and return lines 90, 91. As has previously been described, the designated pressure and return lines extend to the tops and to the bottoms, respectively, of the cylinders of jacks 39, 40, 41. Describing now the operation of the fluid circuit in connection with one valve, for instance, the starboard one 58, the fluid pressure from the fluid pressure supply line 93 enters the inlet chamber 64, passes through the inlet ports 73 to the fluid pressure line 82 and into the tops of the pair of cylinders 39 forcing the pistons 50 and hence the related step 9 down. The fluid below the pistons 50 is returned to the pump return line 94 by way of the return line 83 registering with discharge port 74, and by way of chamber 65 and discharge nipple 67 to line 94. The other valves 59, 60 control the hydraulic circuit therethrough to and from the related cylinders in the same manner.

Now let it be assumed, that it is desired to elevate the starboard step 9, for instance, the appropriate core 70 may be rotated by the lever 100 in the opposite direction to that previously described to register the T branches 73 of the intake and discharge ports 71, 72 with the pair of intake and discharge nipples on the opposite side of the valve, registering with the pressure and return lines 78, 79. As previously described, these lines 78, 79 extend to the bottoms and tops, respectively, of the cylinders 39. In this position of the core 70, the fluid pressure enters valve 58 by way of nipple 66 and inlet chamber 64, passes out through intake port 71 to pressure line 78 and to the bottoms of cylinders 39. The fluid above pistons 50 is returned by way of return line 79, through discharge port 72 of core 70 to discharge chamber 65 and to fluid return line 94 to pump 76. The other valves 59, 60 are operated and control the fluid circuit in the same manner in lifting the related steps.

As will be understood, in the described manual operation of the starboard and port step control valves 58, 59, the associated described clutches between the same and the aileron control are disengaged.

With the clutches between the starboard and port step control valves 58, 59 engaged in the manner already described, the starboard and port steps 9, 10 being partially lowered, for example, the ailerons 7, 8 in neutral position, let it be assumed that the aileron control is operated to set the ailerons for a bank in taking off the water, or circling thereon. As will be clear the starboard and port valve operating pulleys 37, 38 will be rotated by the aileron control reversely, relatively, in correspondence with reverse swinging of the ailerons essential to such banking, and to thereby effect the reverse relative rotation of the valve cores 70 of the starboard and port step control valves 58, 59, to lower the step on the side of the lowered aileron and to elevate the step on the side of the lifted aileron thereby.

In operating any one step 9, 10, 11 independently, the valve cores for the remaining steps may be hydraulically locked by setting of such valve cores through the described manually operating mechanism therefor, and in operating the pair of steps 9, 10 in conjunction with the ailerons, the valve core of the rear step may be set by its manual operating mechanism. Thus, the proper valve cores may be set out of normal position to close proper by-passes so that pressure may be built up in the appropriate valve lines.

By thus operating the steps 9, 10, aerodynamic control is augmented by hydrodynamic control and hydrodynamic control may be varied as desired by disconnection of the appropriate clutches and manual operation of the appropriate starboard and port step control valves 58, 59.

It may be explained that the described hydraulic system is always full. Each valve 58, 59, 60 has a closed position in which the fluid passes through the circuit by way of the bypass 75 of the valve so that in any position of the steps 9, 10, 11, by setting the valves closed the steps may be retained in set position.

The foregoing will, it is believed, suffice to impart a clear understanding of my invention without further explanation.

Manifestly the invention, as described, is susceptible to modification without departing from the inventive concept and right is herein reserved to such modification as fall within the scope of the subjoined claims.

What I claim is:

1. In a seaplane including a hull, a pair of right and left wings, a pair of right and left ailerons on said wings, and an aileron control, a pair of right and left steps at the bottom of the hull arranged upon opposite sides of the keel line, respectively, side by side beneah said wings and pivotally mounted for vertical swinging movement into different downwardly and rearwardly inclined positions, means to operate said steps comprising a fluid pressure circuit including a constantly operating pump, control valves in said circuit for said steps, respectively, means to operate said valves simultaneously through operation of the aileron control in conjunction with operation of the ailerons, and means to disable said last means as regards operation thereby of a selected valve and for subsequently operating the selected valve independently.

2. In a seaplane including a hull, a pair of right and left wings, a pair of right and left ailerons on said wings, and an aileron control, a pair of right and left steps at the bottom of the hull arranged upon opposite sides of the keel line, respectively, side by side beneath said wings and pivotally mounted for vertical swinging movement into different downwardly and rearwardly inclined positions, means to operate said steps comprising a fluid pressure circuit including a constantly operating pump, control valves in said circuit for said steps, respectively, means to operate said valves simultaneously through operation of the aileron control in conjunction with operation of the ailerons, and means to manually operate said valves selectively independently of operation by the aileron control.

3. In a seaplane including a hull, a pair of right and left wings, a pair of right and left ailerons on said wings and an aileron control, a pair of right and left steps at the bottom of the hull arranged upon opposite sides of the keel line side by side beneath said wings and pivotally mounted for swinging movement into different downwardly and rearwardly inclined positions, means to operate said steps into said differently inclined positions comprising a fluid pressure circuit including a constantly operating pump, pressure operative jacks for each step interposed in said circuit, a pair of valves interposed in the circuit for controlling the jacks of each step, respectively, manipulative operating means for each valve, and means to operate said manipulative means simultaneously through operation of said aileron control in conjunction with operation of said ailerons.

4. In a seaplane including a hull, a pair of right and left wings, a pair of right and left ailerons on said wings and an aileron control, a pair of right and left steps at the bottom of the hull arranged upon opposite sides of the keel line side by side beneath said wings and pivotally mounted for swinging movement into different downwardly and rearwardly inclined positions, means to operate said steps into said differently inclined positions comprising a fluid pressure circuit including a constantly operating pump, pressure operative jacks for each step interposed in said circuit, a pair of valves interposed in the circuit for controlling the jacks of each step, respectively, manipulative operating means for each valve, and means to operate said manipulative means simultaneously through operation of said aileron control in conjunction with operation of said ailerons, said last means including a clutch automatically disengaged in limits of operation of said valves.

5. In a seaplane including a hull, a pair of right and left wings, a pair of right and left ailerons on said wings and an aileron control, a pair of right and left steps at the bottom of the hull arranged upon opposite sides of the keel line side by side beneath said wings and pivotally mounted for swinging movement into different downwardly and rearwardly inclined positions, means to operate said steps into said differently inclined positions comprising a fluid pressure circuit including a constantly operating pump, pressure operative jacks for each step interposed in said circuit, a pair of valves interposed in the circuit for controlling the jacks of each step, respectively, manipulative operating means for each valve, and means to operate said manipulative means simultaneously through operation of said aileron control in conjunction with operation of said ailerons, said last means including a clutch, and cam means for disengaging the clutch in limits of operation of said valves.

JAMES F. PARKER.